United States Patent
Zhang et al.

(10) Patent No.: US 9,334,598 B2
(45) Date of Patent: May 10, 2016

(54) WASHING METHOD FOR WASHING MACHINE AND A WASHING MACHINE

(75) Inventors: Tao Zhang, Qingdao (CN); Yun Tian, Qingdao (CN); Wenting Xu, Qingdao (CN); Qiuying Gao, Qingdao (CN); Menghu Gong, Qingdao (CN); Feng Li, Qingdao (CN)

(73) Assignees: HAIER GROUP CORPORATION, Qingdao, Shandong (CN); QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 685 days.

(21) Appl. No.: 13/616,976

(22) Filed: Sep. 14, 2012

(65) Prior Publication Data

US 2014/0033444 A1 Feb. 6, 2014

(30) Foreign Application Priority Data

Aug. 3, 2012 (CN) .......................... 2012 1 0274216

(51) Int. Cl.
| | |
|---|---|
| D06F 35/00 | (2006.01) |
| D06F 37/30 | (2006.01) |
| D06F 17/08 | (2006.01) |
| D06F 17/10 | (2006.01) |
| D06F 39/08 | (2006.01) |

(52) U.S. Cl.
CPC .............. *D06F 35/006* (2013.01); *D06F 17/08* (2013.01); *D06F 17/10* (2013.01); *D06F 37/306* (2013.01); *D06F 39/083* (2013.01); *D06F 39/088* (2013.01); *Y02B 40/56* (2013.01)

(58) Field of Classification Search
CPC ....... D06F 17/06; D06F 17/10; D06F 35/006; D06F 37/306; D06F 39/083; D06F 39/088
See application file for complete search history.

(56) References Cited

U.S. PATENT DOCUMENTS

| | | | |
|---|---|---|---|
| 1,704,932 A | 3/1929 | Altorfer | |
| 4,068,503 A | 1/1978 | Platt | |
| 5,361,439 A * | 11/1994 | Malchow | 8/158 |
| 5,727,403 A * | 3/1998 | Na | 68/133 |
| 6,212,722 B1 * | 4/2001 | Pinkowski et al. | 8/158 |
| 7,690,063 B2 * | 4/2010 | McAllister et al. | 8/159 |
| 7,716,769 B2 * | 5/2010 | Ha et al. | 8/158 |
| 2003/0200774 A1 * | 10/2003 | Kim et al. | 68/133 |
| 2003/0208855 A1 * | 11/2003 | McAllister et al. | 8/159 |

FOREIGN PATENT DOCUMENTS

| | | |
|---|---|---|
| CN | 2898085 | 5/2007 |
| EP | 0837171 A1 | 4/1998 |

* cited by examiner

*Primary Examiner* — Joseph L Perrin
(74) *Attorney, Agent, or Firm* — Buchanan Ingersoll & Rooney PC (57) ABSTRACT

A washing machine contains a wash tub, an impeller and a motor. Clothing is put into the tub and the load is detected. Water is added until the water level is below or equal to the load height. To begin washing, the impeller drives the clothing to overturn, resulting in generating three types of water flows: agitating flow, enhancing flow and balancing flow. At first, the agitating flow breaks the balance of the load to disperse clothing, then the enhancing flow overturns clothing for washing. Finally, the balancing flow maintains the circulation path for the load balance overturning. Single sequential control or repeatedly alternating cycle control of the three types of water flows can be adopted for washing. The invention can save water, improve washing efficiency and avoid intertwining of clothing, characterized by full-range, thorough, repeated and efficient washing.

12 Claims, 4 Drawing Sheets

WASHING METHOD FOR WASHING MACHINE AND A WASHING MACHINE

FIELD OF THE INVENTION

The invention relates to a washing machine and a washing method, especially a washing method for washing machine and a washing machine capable of even overturn and washing free of intertwining.

BACKGROUND OF THE INVENTION

Currently, washing method of an impeller washing machine is to achieve cleaning by special water flow generated from impeller rotation or simultaneous rotation of the impeller and inner tub to overturn the clothing and pose force on it during overturn so that the clothing can be washed repeatedly through self friction and friction with impeller and inner tub wall. Impeller of the impeller washing machine has various shapes such as plate, bar, bowl shapes, etc.; regardless of shape change, ultimate goal of the impeller is to improve cleanliness and reduce clothing intertwining. However, high cleanliness and low intertwining rate are contradictory. Usually, the cleanliness will increase with high intertwining rate, or the cleanliness decrease with low intertwining rate. Existing impeller washing machine has such disadvantages as large water and detergent consumption, long washing time, clothing intertwining and knotting, uneven washing and deformation; or, clothing washing is realized via impact force of water flow formed by centrifugal force generated by inner tub rotation. Usually, clothing is washed as a whole. Although water flow has an effect on washing, clothing cannot be dispersed while will be intertwined as a whole.

In order to improve cleanliness, the impeller is required to rotate rapidly at large angles during washing. Clothing will be driven by water flow generated by centrifugal force to move along the same direction rapidly. Eventually, clothing will be intertwined, torn and damaged, especially high-end clothing which is more readily damaged; moreover, in case of simply relying on water flow during washing, the mode of movement is simple and fixed, resulting in low overturn efficiency of clothing in the tub. Hence, more times of washing is required to be conducted to achieve washing effects of the clothing.

Besides, when the washing machine is running, impeller rotates or oscillates to generate ring-shaped water flow, and movement of clothing in the tub depends on fluid motion or fluidic power. In order to realize required ring-shaped overturn mode, it is also necessary that automatic washing machine with impeller at the bottom is filled with washing liquid. Height of the washing liquid shall be able to completely submerge fabrics put into the washing drum. Hence, it will consume large quantity of water. In addition, since the quantity of washing liquid is large, more detergent must be used to achieve enough concentration. As a result, the washing cost is high and water resources will be polluted to a certain extent.

China Patent Publication No. CN2898085Y discloses an impeller of washing machine, comprising a round underpan and water string set on the underpan, which is characterized in that the underpan has high circumference and low center, forming a concave curved sphere. The water string comprises a central water string, a primary water string and a secondary water string, and the central water string is positioned in the middle of the underpan; the primary water string is arranged radially on the underpan, on both sides thereof, a bevel tilting outwards is positioned; the secondary water string is also arranged radially on the underpan, on both sides thereof, a bevel tilting outwards is positioned; the primary water string is spaced from the secondary water string, the central water string is higher than the primary water string which is higher than the secondary water string.

US Patent Publication No. U.S. Pat. No. 1,704,932A discloses a washing machine, comprising a dolly or agitating member operative from and by means of a shaft passing up through the bottom of the tub or container fins, integrating with radially arranged blades or baffle members and an intermediate surface inclined or curved upwardly from its peripheral edge, that the resultant action of the dolly or agitator; as it is alternately oscillated is to cause the articles being washed to be moved toward the center of the dolly or agitating member and upwardly and thence outwardly and downwardly; or in other words impart to such articles a slow whirl like motion radially of the dolly or agitator and thereby more effectively cleanse the articles, by constant agitation and the forcing of air and water through the articles. This invention has reference to washing machines, and it has for its principal object to improve the dolly or agitating means, whereby to produce a more effective and improved washing action on the articles deposited in the tub or container thereof.

EP Patent No. EP0837171B1 discloses an automatic washer for washing clothes, the automatic washer comprising: an imperforate wash tub, a perforated wash basket having a cylindrical side wall, provided within and rotatable relative to the wash tub, a rotatable washplate with a bottom plate, a peripheral wall and a centrally disposed annular mounting collar, provided within and rotatable relative to the wash basket, a drive system connected to the wash basket and the wash tub for rotating the wash basket and the wash plate, and a least two diametrically opposed ripples provided on and extending upwardly from the bottom plate of the wash plate, characterised in that each ripple has a saddle shaped surface contour defining opposing sloped walls which extend respectively radially inwardly and radially outwardly form a low point substantially midway between the peripheral wall and the outer edge of the annular collar and in that the peripheral wall is substantially perpendicular to the bottom plate. The radially outwardly extending sloped wall of the ripples rising to meet the upper part of the peripheral wall, and in that an annular sealing lip is provided around the outside of the peripheral wall, extending outwardly substantially perpendicularly from the top edge of the peripheral wall to the cylindrical side wall of the wash basket.

US Patent Publication No. U.S. Pat. No. 4,068,503A discloses an improved agitator means for use with an automatic washer having a clothes washing receptacle and drive means for driving an agitator in an oscillatory fashion. The improved agitator means of the present invention is a double action agitator and includes a lower agitator element which is engageable with the drive means for oscillation about an axis in the usual manner and an upper agitator element which is coaxial with the lower element and is coupled to the drive shaft by means of a one-way clutch for unidirectional rotation about the axis of the agitator. The upper agitator element is provided with auger-like vane means for urging clothes within the receptacle downwardly toward the lower agitator element where they are contacted by a set of generally vertically-extending vanes disposed about the skirt portion of the lower agitator element. In effect, therefore, the upper agitator element acts to continuously feed clothes downwardly along the barrel of the agitator where they come under the influence of the oscillating vertically positioned vanes of the lower agitator element which direct the clothes radially outwardly toward the periphery of the basket, and eventually upwardly and back to the barrel of the upper agitator element, completing a repeating rollover cycle which is extremely efficient for securing a uniform scrubbing contact of the clothes with the wash liquid.

In witness whereof, the invention is provided.

SUMMARY OF THE INVENTION

Technical problems to be solved by the present is to overcome existing technical deficiencies and provide a washing method for washing clothes by using less washing water and driving clothing to overturn evenly up and down to minimize intertwining, and improving clothing cleanliness rate and evenness degree.

Another object of the invention is to provide a washing machine with the washing method.

In order to solve the technical problems, the basic idea of technical scheme for the invention is: a washing method for washing machine which contains a wash tub and an impeller placed at the bottom of the tub, including:

Putting the clothing into the tub;

Detecting the load and inflooding water according to the load capacity;

Washing, that different water flows generated by controlling rotation-stop ratio of the impeller perform single sequential coordination or repeatedly alternating cycle coordination, so as to break the balance of the load to disperse the clothing, and realize even overturn and washing, and keep the load evenly overturning.

During washing, three types of water flows are generated by controlling rotation-stop ratio of the impeller: agitating flow, enhancing flow, and balancing flow; at first, the agitating flow will break the balance of the load to disperse the clothing, then the enhancing flow will overturn the clothing for washing, at last, the balancing flow will maintain the circulation path for the load evenly overturning; agitating flow, enhancing flow, and balancing flow will perform single sequential washing or repeatedly alternating cycle washing.

During washing, overturn path of the clothing comprises: the clothing at the bottom being dragged to the center of the impeller by enhancing flow generated by impeller rotation, and the clothing uprushing, overturning outwardly and descending on the center of the impeller, then the clothing moving to the center of the impeller again after falling down to the bottom. The said overturn process will be repeated.

Furthermore, an inlet water level is lower than or equal to a height of the load.

Preferably, the inlet water level meets water quantity by which the clothing can be completely wetted and contact with upper surface of the impeller during overturn.

Action time of the enhancing flow is at least shorter than that of the agitating flow. i.e., the action time of the enhancing flow is only shorter than that of the agitating flow, or, the action time of the enhancing flow is shorter than that of both the agitating flow and the balancing flow. Furthermore, action time of the agitating flow is the same with that of the balancing flow.

Rotation-stop ratio of the impeller corresponding to the agitating flow can be the same with or different from that corresponding to the balancing flow.

The intensity of the enhancing flow is stronger than that of the agitating flow. The intensity relates to corresponding rotation-stop ratio of the impeller. The stronger the rotation-stop ratio is, the stronger the flow intensity is.

When drive unit of the washing machine is a frequency direct drive motor, the intensity of the agitating flow is adjusted for load capacity. The larger the load capacity is, the stronger the intensity is.

Rotation-stop ratios of the impeller corresponding to the agitating flow, the enhancing flow and the balancing flow are adjusted according to load capacities. The larger the load capacity is, the larger the rotation-stop ratios of the impeller corresponding to the agitating flow, the enhancing flow and the balancing flow are.

On the washing machine, different gears are set according to different ranges of load capacities, which at least includes the first load indicating the minimum range of load capacity. During washing with the enhancing flow corresponding to the first load, within the set working time of enhancing flow, the impeller rotates and stops multiple times in the same direction as per corresponding rotation-stop ratio and then repeats the rotation and stop in the opposite direction; during washing with the agitating flow and the balancing flow corresponding to any load capacity and the enhancing flow corresponding to any load capacity excluding the first load, the impeller performs forward and reverse alternative rotation as per corresponding rotation-stop ratio.

For rotation-stop ratio of the impeller corresponding to the agitating flow, the enhancing flow and the balancing flow, time of each rotation is 0.2-3.0 s and that of each stop is 0-3.0 s. Any time within the two ranges will combine to form the rotation-stop ratio corresponding to the agitating flow, the enhancing flow and the balancing flow.

In specific, as for the rotation-stop ratios of the impeller corresponding to the agitating flow and the balancing flow, time of each rotation is 0.2-2.0 s and that of each stop is 0.2-2.0 s. The time of each rotation and that of each stop within the two ranges will combine to form the rotation-stop ratios corresponding to the agitating flow and the balancing flow.

As for the rotation-stop ratio of the impeller corresponding to the enhancing flow, time of each rotation is 0.2-3.0 s and that of each stop is 0.2-3.0 s. The time of each rotation and that of each stop within the two ranges will combine to form the rotation-stop ratio corresponding to the enhancing flow.

After washing, the drive motor rotates and stops intermittently within the set time for dewatering and drainage. Then execute spraying and rinsing with no drainage, and the drive motor rotates and stops intermittently.

In the drainage stage during rinsing, the drive motor simultaneously rotates and stops intermittently for dewatering; during dewatering, the washing machine will perform dewatering by utilizing the method of no drainage or drainage alternation. After dewatering, the wash tub stops from rotating and drainage begins. The most water in the clothing is thrown away and drained out in the drainage stage during rinsing. During dewatering, since water quantity in the clothing is reduced, the water thrown away from the clothing does not need to be drained within a certain time period during which more water thrown away from the clothing will be accumulated. Then entering the next set time period, start the drainage, and then stop the drainage (repeat the drainage start and stop). Finally, realize drainage when the wash tub stops from rotating. The dewatering method of alternation of drainage start and stop can save energy of drainage equipment.

An washing machine of the invention is used for the washing method comprises an impeller which contains an impeller disk and multiple groups of water spinning blades arranged on the surface of the impeller disk, the impeller disk being of basin-shaped structure with a bulge on the center, each group of water spinning blades extending from the center of the impeller disk to the edge, the water spinning blade mainly consisting of at least two convex ribs which incline to both sides in extension direction of the water spinning blade respectively to form twisted structure of the water spinning blade.

The water spinning blade is of linear or curved shape in extension direction. When the water spinning blade is of curved shape in extension direction, the water spinning blade have at least two convex ribs with rates of curve or slope projected on the impeller disk surface being different, or, the water spinning blade at least consists of curved convex rib and linear convex rib.

The water spinning blade contains a first convex rib close to the center of the impeller disk and a second convex rib close to the edge of the impeller disk. The first convex rib and the second convex rib incline to the surfaces of the impeller disk on different sides respectively. Slope angles between the convex rib and vertical surface of the impeller disk where the water spinning blade intersects with the surface the impeller disk is less than or equal to 35°. Smooth transition can be realized between both sides of the water spinning blade and the surface of the impeller disk.

Projections of the first convex rib and the second convex rib on the surface of the impeller disk are two arches whose centers of circle are on both sides of the water spinning blade respectively.

Central angle between two ends of the water spinning blade is 15°-90°, with 30°-60° preferred.

A height change of an upper surface of the water spinning blade in extension direction from the center of the impeller disk to the edge is: at first rising to a maximum height, then falling to a minimum height and finally rising to realize smooth transition with inner circumferential wall of basin-shaped impeller disk. Height difference between the maximum height and the minimum height of the water spinning blade is 1-1.5 times of a depth of impeller disk. Height difference between the maximum height of the water spinning blade and the center of the impeller disk is 0-0.2 times of the depth of the impeller disk. Position of smooth transition between the water spinning blade and inner circumferential wall of the impeller disk is located on ⅓-⅔ of the impeller disk depth.

Multiple decoration areas are set on the surface of the impeller disk between two water spinning blades, and small water penetrating holes are arrange on these decoration areas. The decoration areas are water-mark-shaped shallow slots with different sizes, with depth range of 1-5 mm. Multiple small water penetrating holes are distributed evenly in the shallow slots.

After adopting the technical scheme, the invention has the following beneficial effects, compared with the prior art.

The invention adopts washing modes corresponding to the agitating flow, the enhancing flow and the balancing flow. The enhancing flow can increase overturn amplitude of the clothing, and the clothing at the tub bottom overturns upwardly and the clothing around the top overturns downwardly. The agitating flow can help to realize even washing and untwining of the clothing overturned by the enhancing flow. The balancing flow keeps the load evenly overturning. Coordination with the impeller of the washing machine can help to realize even washing and up-down overturn of the clothing, so as to achieve better washing effects; the adopted overturn washing makes the clothing evenness degree more than 90% and cleanliness rate more than 0.85. Generally, cleanliness rate of existing washing machine ranges from 0.7 to 0.8, with maximum evenness degree of 80%; as for the washing machine in the invention, the structure of water spinning blade of the impeller can apply certain force to the clothing during forward and reverse rotation washing, resulting in lower water consumption and stronger friction between the impeller and the clothing. Hence, wash buffer with the same concentration needs less detergent. Water saving and detergent saving (relatively) can be achieved simultaneously. Pollution caused by drainage can be eased. About 20%-40% water can be saved for each washing.

In combination with the drawings, the following contents provide further description of the preferred embodiments of the invention in detail.

DETAILED DESCRIPTION OF THE PREFERRED EMBODIMENTS

A washing machine in the invention contains a wash tub, a rotatable impeller and a motor. The motor drives the impeller to realize forward and reverse rotation during washing. According to FIG. 3 and FIG. 4, the impeller 1 contains an impeller disk 2 and multiple groups of water spinning blades 3 arranged on the surface of the impeller disk. In this embodiment, three groups of water spinning blades are used, or, four or five groups can be used as well. The impeller disk 2 is of basin-shaped structure with a bulge on the center. The edge of the basin-shaped structure is an inner circumferential wall 4 extending upwardly. Each group of water spinning blades 3 extends toward the edge from the center 5 of the impeller disk. The water spinning blade 3 mainly consists of at least two convex ribs which incline to both sides in extension direction of the water spinning blade respectively to form twisted structure of the water spinning blade.

Figure 1:
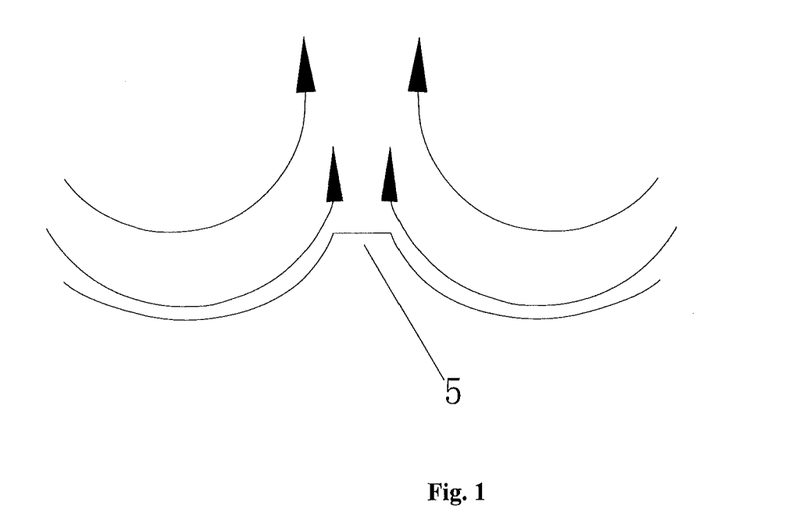
FIG. 1 is a schematic diagram of center-upward overturn trace of the clothing for washing machine in the invention.
Figure 2:
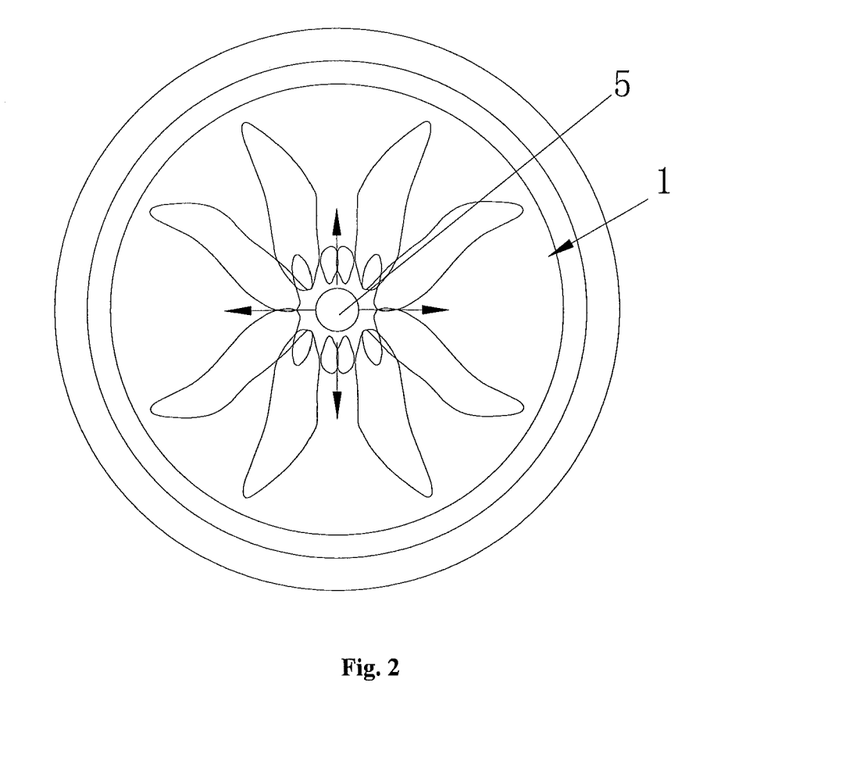
FIG. 2 is a schematic diagram of outward overturn state of the clothing for washing machine in the invention.
Figure 3:
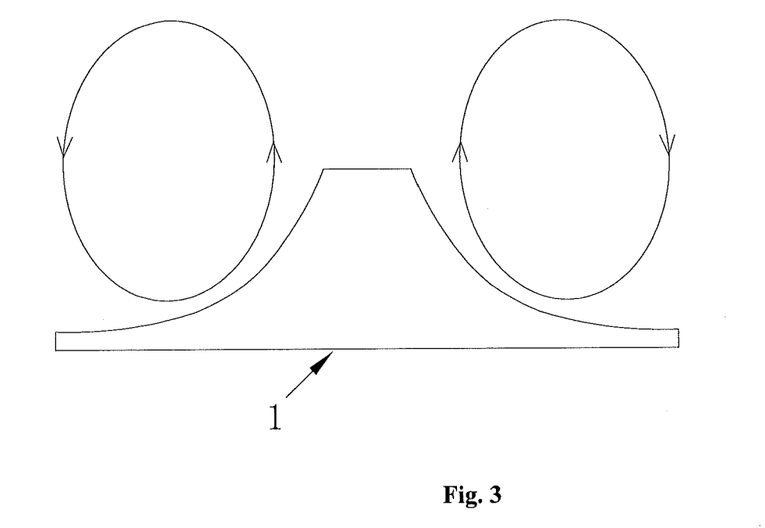
FIG. 3 is a schematic diagram of up-down cycle overturn trace of the clothing for washing machine in the invention.
Figure 4:
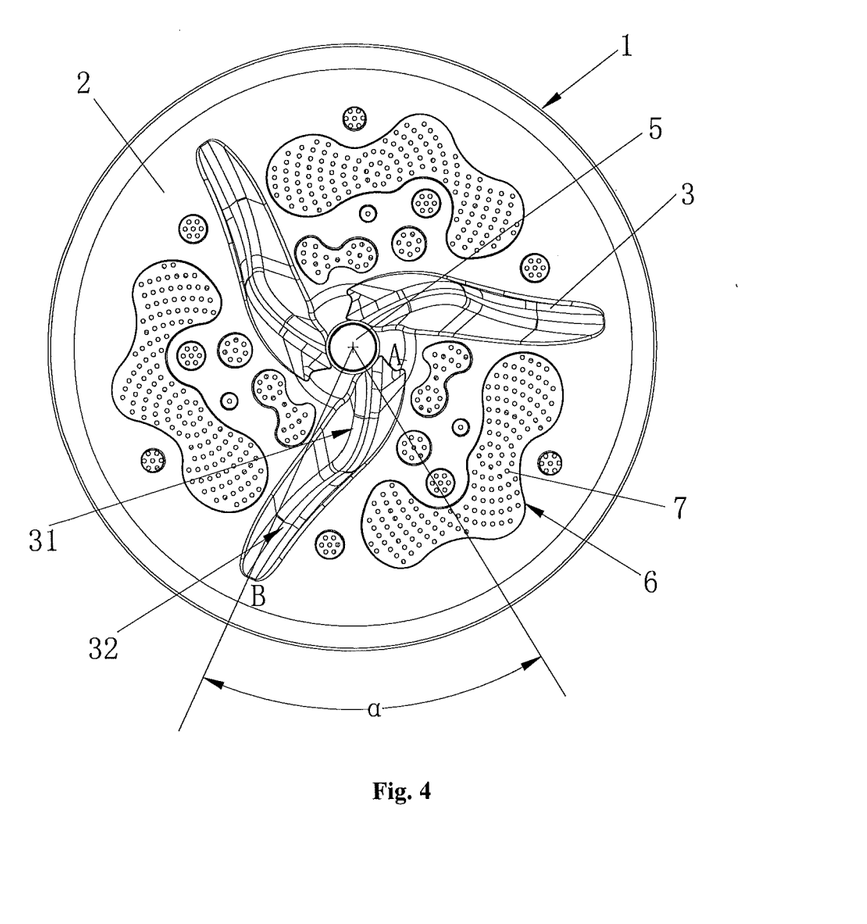
FIG. 4 is a structure diagram of the impeller in the invention.
Figure 5:
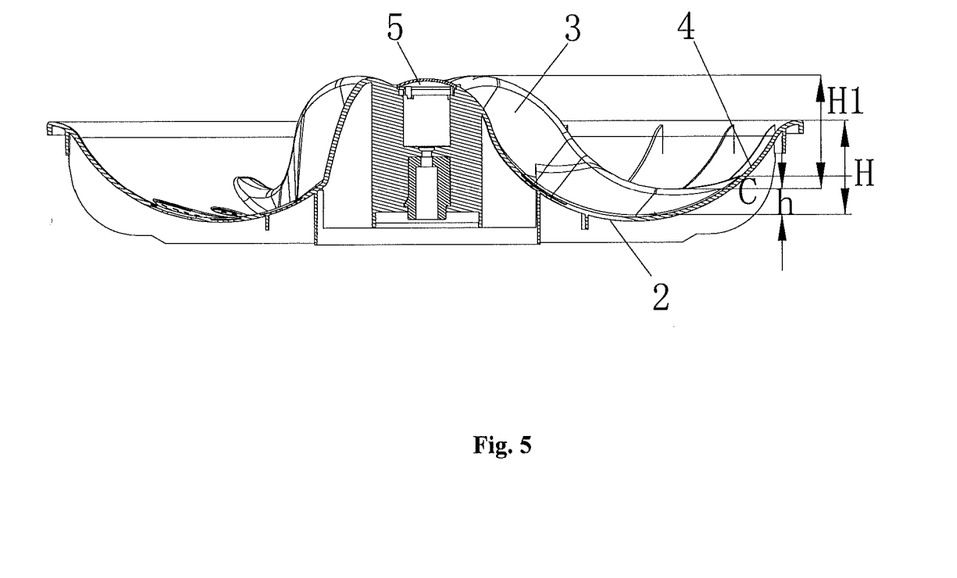
FIG. 5 is a schematic diagram of cross-section structure of the impeller in the invention.

Furthermore, the water spinning blade 3 is of linear or curved shape in extension direction, when the water spinning blade is of curved shape in extension direction, the water spinning blade have at least two convex ribs with rates of curve or slope projected on the surface of the impeller disk being different. Or, the water spinning blade at least consists of curved convex rib and linear convex rib.

Embodiment 1

Shown as FIG. 3, in this embodiment, the water spinning blade 3 contains a first convex rib 31 close to the center of the impeller disk 5 and a second convex rib 32 close to the edge of the impeller disk. The first convex rib and the second convex rib incline to the surface of the impeller disk on different sides respectively. Slope angle between the first convex rib 31 and a vertical surface is within 5-10°. The vertical surface is perpendicular to the surface of the impeller disk on the intersection between the water spinning blade and the surface of the impeller disk and the inclination direction is clockwise rotation direction of the impeller. Slope angle between the second convex rib 32 and the vertical surface is within 10-15°, and the inclination direction is clockwise rotation direction of the impeller (referred to FIG. 3). Both sides of the water spinning blade 3 realize smooth transition with the impeller disk surface. Projections of the first convex rib 31 and the second convex rib 32 on the surface of the impeller disk are two arches whose centers of circle are on both sides of the water spinning blade 3 respectively. Smooth transition can be realized between the first convex rib 31 and the second convex rib 32. Central angle α between end A and end B of the water spinning blade 3 is 45°-60°.

Embodiment 2

According to FIG. 4, in this embodiment, A height change of an upper surface of the water spinning blade 3 in extension direction from the center 5 of impeller disk to the edge is: rising to the maximum height, falling to the minimum height and then rising to realize smooth transition with the inner circumferential wall 4 of basin-shaped impeller disk. Height difference H1 between the maximum height and the minimum height of the water spinning blade is 1.2-1.3 times of the depth H of impeller disk. Height difference between the highest point of the water spinning blade and the center of the impeller disk is 0.1 times of the depth of the impeller disk. Point C of smooth transition between the water spinning blade 3 and the inner circumferential wall 4 of the impeller disk is located ⅓-⅔ of the depth H of the impeller disk. i.e., height difference h between point C and the lowest point of the impeller disk is ⅓-⅔ times of the depth H of the impeller disk, with ½ times preferred.

Embodiment 3

According to FIG. 3, multiple decoration areas 6 are set on the surface of the impeller disk between two water spinning blades 3, and these decoration areas are provided with small water penetrating holes 7. The decoration areas are watermark-shaped shallow slots with different sizes, with depth of 2 mm. Multiple small water penetrating holes are distributed evenly in the shallow slots.

The washing machine in the invention contains fully-automatic machine and double-tub washing machine. During washing, putting the clothing into the tub and detecting the load; inflooding water to reach the water level corresponding to the load capacity. The water level is lower than or equal to the load height; during washing, different types of water flows generated by controlling rotation-stop ratio of the impeller perform single sequential coordination or repeatedly alternating cycle coordination, so as to break the load balance to disperse clothing, and realize even overturn and washing, and keep the load evenly overturning.

Further more, during washing, three types of water flows are generated by controlling rotation-stop ratio of the impeller: the agitating flow, the enhancing flow and the balancing flow. At first, using the agitating flow for washing and completely wet the clothing to realize even overturn and washing. After a certain time period for washing by the agitating flow, using the enhancing flow for washing and opening the clothing to increase the overturn amplitude and achieve adequate washing. At last, using the balancing flow to keep the load evenly cycle overturning; single sequential control or repeatedly alternating cycle control of the three types of water flows is adopted for the washing.

In the invention, rotation-stop ratio of the impeller corresponding to the agitating flow can be the same with or different from that corresponding to the balancing flow. Besides, action time of the agitating flow and the balancing flow can be the same with or different from each other as well. The agitating flow breaks the load balance initially to disperse the clothing, and then the enhancing flow overturns the clothing, so the clothing has been distributed evenly and begins to overturn for washing. As a result, when rotation-stop ratio of the impeller corresponding to the agitating flow is the same with that corresponding to the balancing flow, the function of the balancing flow whose rotation-stop ratio of the impeller is the same with that corresponding to the agitating flow, do not break the load balance instead of keeping the load evenly overturning. Hence, if rotation-stop ratio corresponding to the agitating flow is the same with that corresponding to the enhancing flow, they belong to two different functions while share the same running mode. After a certain time period for keeping evenly overturning to wash, the washing is completed or needs to be continued to wash. At this moment, the intertwinement of the clothing may occur. In order to better even wash and to avoid any possible intertwining, cycle mode of the agitating flow, the enhancing flow and the balancing flow for washing is adopted. During washing in the alternating cycle of the said water flows, when the balancing flow joins to the agitating flow for each cycle, the driven modes of rotation-stop ratios corresponding to the two flows combine into one mode, and driven time is the sum of driven time of the two flows.

After washing, the drive motor rotates and stops intermittently within the set time for dewatering and drainage. Then executing spraying and rinsing with no drainage, And the drive motor rotates and stops intermittently.

In the drainage stage during rinsing, the drive motor simultaneously rotates and stops intermittently for dewatering; during dewatering, the washing machine will perform dewatering by utilizing the method of no drainage or drainage alternation. After dewatering, the wash tub stops from rotating and drainage begins. In the drainage stage during rinsing, most water in the clothing is thrown away and drained out. During dewatering, since of water quantity in the clothing is reduced, the water thrown away from the clothing does not need to be drained within a certain time period during which more water thrown away from the clothing will be accumulated. Then entering the next set time period, start the drainage, and then stop the drainage (repeat the drainage start and stop). Finally, realize drainage when the wash tub stops from rotating. The dewatering method of alternation of drainage start and stop can save energy of drainage equipment. Preferably, at the beginning of the dewatering process, the drive motor rotates and stops intermittently.

Further more, the inlet water level meets water quantity by which the clothing can be completely wetted and will not float or separate from upper surface of the impeller. The water level is lower than the clothing height, so as to increase friction between the impeller and the clothing and drag the clothing to the impeller center during washing.

The agitating flow, the enhancing flow and the balancing flow in the invention are controlled by the different rotation-stop ratios of the impeller generated by driving the impeller to rotate. The intensity of the enhancing flow is stronger than that of the agitating flow. Strong intensity of the enhancing flow can increase the overturn amplitude of the load.

The intensity of the enhancing flow is stronger than that of the agitating flow. When drive unit of the washing machine is a frequency direct drive motor, the intensity of the agitating flow is adjusted for load capacity. The larger the load capacity is, the stronger the intensity is.

On the washing machine, different gears are set according to different ranges of load capacities, which at least include the first load indicating the minimum range of load capacity. During washing with the enhancing flow corresponding to the first load, within the set working time of enhancing flow, the impeller rotates and stops multiple times in the same direction as per corresponding rotation-stop ratio and then repeats the rotation and stop in the opposite direction; during washing with the agitating flow and the balancing flow corresponding to any load capacity and the enhancing flow corresponding to any load capacity excluding the first load, the impeller performs forward and reverse alternative rotation as per corresponding rotation-stop ratio.

In specific, when rated load of the washing machine is M, the first load is set to be more than 0 and less than or equal to 0.3M. The second load is more than 0.3M and less than or equal to 0.7M. The third load is more than 0.7M and less than or equal to M. The division method is different according to different models and rated loads.

For rotation-stop ratio of the impeller corresponding to the agitating flow, the enhancing flow and the balancing flow, time of each rotation is 0.2-3.0 s and that of each stop is 0-3.0 s. Any time within the two ranges will combine to form a rotation-stop ratio corresponding to the agitating flow, the enhancing flow and the balancing flow, In specific, as for rotation-stop ratios of the impeller corresponding to the agitating flow and the balancing flow, time of each rotation is 0.2-2.0 s and that of each stop is 0.2-2.0 s. Any rotation time and stop time within the two ranges will combine to form the rotation-stop ratios corresponding to the agitating flow and the balancing flow.

As for rotation-stop ratio corresponding to the enhancing flow, time of each rotation is 0.2-3.0 s and that of each stop is 0.2-3.0 s. Any rotation time and stop time within the two ranges will combine to form the rotation-stop ratio corresponding to the enhancing flow.

Embodiment 4

Figure 6:
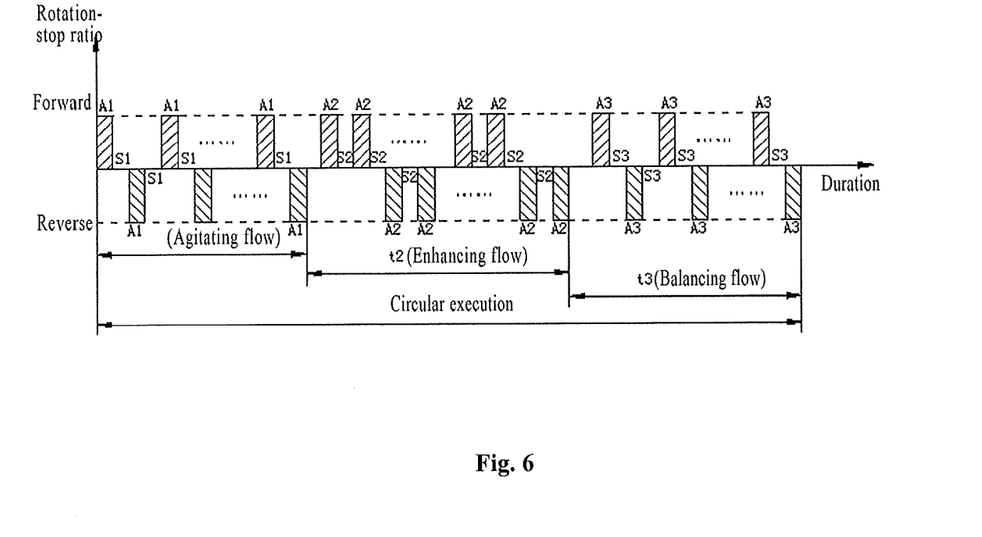
FIG. 6 is a sequence diagram of rotation-stop ratios corresponding to water flows during the first load washing for washing machine in the invention.
Figure 7:
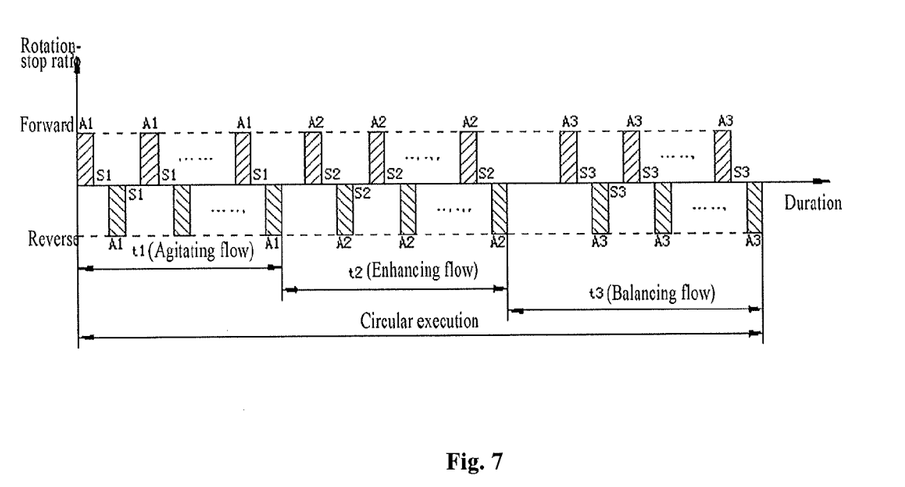
FIG. 7 is a sequence diagram of rotation-stop ratios corresponding to water flows during the second and third load washing for washing machine in the invention.

FIGS. 6 and 7 refer respectively to a sequence diagram of rotation-stop ratios corresponding to all kind of water flows during the first load washing, the second load washing, and third load washing, wherein, t1, t2 and t3 indicate the single washing time for the agitating flow, the enhancing flow and the balancing flow respectively. A1, A2 and A3 indicate the rotation time of the impeller for the agitating flow, the enhancing flow and the balancing flow respectively. S1, S2 and S3 indicate the stop time of the impeller for the agitating flow, the enhancing flow and the balancing flow respectively. Ai/Si, i=1, 2 or 3, i.e., rotation-stop ratio corresponding to the agitating flow, the enhancing flow and the balancing flow respectively.

In this embodiment, a washing machine with rated load capacity of 10 kg is taken as an example:

The first load: 30% of load capacity (3 kg)
The second load: 50% of load capacity (5 kg)
The third load: 70% of load capacity (7 kg)
Rotation-stop ratio of the impeller:
Rotation, including forward rotation and reverse rotation: 0.2 s-3.0 s; stop, including stop after forward rotation and stop after reverse rotation: 0.2 s-2.0 s. Rotation time and stop time of the said two ranges can combine to the rotation-stop ratio of the impeller corresponding to each water flow.

At first, use the agitating flow for washing, completely wet the clothing and realize even overturn and washing. Rotation-stop ratios of the impeller corresponding to different load capacities are shown as follows:

The first load: the optimal rotation-stop ratio is 0.4/0.8 s
The second load: the optimal rotation-stop ratio is 0.5/0.5 s
The third load: the optimal rotation-stop ratio is 0.7/0.7 s The impeller corresponding to the agitating flow performs alternating forward and reverse rotation as per the said rotation-stop ratios. i.e., the rotation-stop ratio of impeller corresponding to the first load gear is: rotate forward for 0.4 s, stop for 0.8 s, rotate reversely for 0.4 s, stop for 0.8 s, rotate forward again for 0.4 s, stop for 0.8 s, rotate reversely for 0.4 s and stop for 0.8 s. Repeat the said cycle actions for 1 min and 12 s (see FIG. 6); in a similar way, the impeller corresponding to the second load gear and the third load gear shares the same rotation method while the rotation-stop ratios and rotation time are different. The rotation-stop ratio of the impeller corresponding to the second load gear is 0.5/0.5 s, with action time of 3 min and 10 s. The rotation-stop ratio of the impeller corresponding to the third load gear is 0.7/0,7 s, with action time of 2 min and 13 s (see FIG. 7).

After a certain time period of washing by using the agitating flow, use the enhancing flow for washing and open the clothing, so as to realize up-down overturn of the clothing in the wash tub and achieve adequate washing. At this moment, rotation-stop ratios of the impeller corresponding to the enhancing flow for the different load capacities are shown as follows:

The first load: the optimal rotation-stop ratio is 0.4/0.4 s
The second load: the optimal rotation-stop ratio is 1.2/1.0 s
The third load: the optimal rotation-stop ratio is 2.5/1.2 s During washing with the enhancing flow, the overturning effect is not obvious due to less load and small friction on the loading cloth on the first load. The rotation-stop ratio of the impeller corresponding to the enhancing flow is that it rotates forward for 0.4 s and then stops for 0.4 s, and again rotates forward for 0.4 s and then stops for 0.4 s. After forward rotation in such a circular manner for 4 s, it will rotate reversely for 0.4 s and then stop for 0.4 s, and again run in such a circular manner for 4 s (Refer to FIG. 6). For the gears of the second load and third load, the impeller performs forward and reverse rotation as per corresponding rotation-stop ratio. Namely, the rotation-stop ratio of the impeller corresponding to the enhancing flow at the gear of the second load is that the impeller rotates forward for 1.2 s and stops for 1.0 s, and then rotates reversely for 1.2 s and stops for 1.0 s; and again rotates forward for 1.2 s and stops for 1.0 s, and then rotates reversely for 1.2 s and stops for 1.0 s, repeating said circular actions for 25 s. Similarly, the rotation-stop ratio of the impeller corresponding to enhancing flow at the gear of the third load is that the impeller rotates forward for 2.5 s and then stops for 1.2 s, and then rotates reversely for 2.5 s and then stops for 1.2 s; and again rotates forward for 2.5 s and then stops for 1.2 s, and then rotates reversely for 2.5 s and then stops for 1.2 s, repeating said actions for 45 s (referring to FIG. 7).

The balancing flow will maintain the circulation path for load evenly overturning. With different load capacities, the rotation-stop ratios of the impeller corresponding to balancing flow are shown as in the below:

The first load: the optimal rotation-stop ratio is 0.3/0.4 s
The second load: the optimal rotation-stop ratio is 0.5/0.5 s
The third load: the optimal rotation-stop ratio is 0.5/0.5 s In this embodiment, when the load is the small, namely the first load, the rotation-stop ratio of the impeller corresponding to balancing flow and that corresponding to agitating flow are different, but their action time is the same and all is 1 min and 12 s. For the second load, the rotation-stop ratio of the impeller corresponding to the balancing flow is the same with that corresponding to agitating flow and their action time is the same too, all is 3 min and 10 s, For the third load, the rotation-stop ratio of the impeller corresponding to balancing flow and that corresponding to agitating flow are different, but their action time is the same, all is 2 min and 13 s.

After washing with balancing flow, the agitating flow, enhancing flow and balancing flow will proceed. Said processes will be repeated circularly till finishing washing. Or the agitating flow, the enhancing flow and the balancing flow are applied once for each, and the action time of each flow is prolonged correspondingly.

Embodiment 5

Take the fully-automatic washing machine, the rated load capacity of which is 12 kg, as an example:

The first load: 30% of load capacity (3.6 kg)
The second load: 70% of load capacity (8.4 kg)
The third load: 100% of load capacity (12 kg)

Water level on condition that the loading cloth is completely drenched:

The water level in the wash tub is 100 mm below the loading cloth.

Rotation-stop ratio of the impeller:

Rotation (including forward rotation and reverse rotation): 0.5-3.0 s; stop (including stop after forward rotation and stop after reverse rotation): 0.1-2.5 s. Rotation time and stop time of the said two ranges can combine to the rotation-stop ratio of the impeller corresponding to each water flow.

At first, use the agitating flow for washing, completely wet the cloth and realize even overturn and washing. Rotation-stop ratios of the impeller corresponding to different load capacities are shown as follows:

The first load: the optimal rotation-stop ratio is 0.5/1.0 s
The second load: the optimal rotation-stop ratio is 0.7/0.7 s
The third load: the optimal rotation-stop ratio is 0.8/0.8 s The forward and reverse rotation mode of the impeller corresponding to the agitating flow are the same with those in Embodiment 1, but rotation-stop ratios and rotation durations are different.

The rotation-stop ratios of the impeller corresponding to the enhancing flow for different load capacities are shown as follows:

The first load: the optimal rotation-stop ratio is 0.5/0.5 s
The second load: the optimal rotation-stop ratio is 1.5/1.2 s
The third load: the optimal rotation-stop ratio is 2.8/1.6 s The rotation-stop ratio corresponding to the enhancing flow at first load is that the impeller rotates forward for 0.5 s and then stops for 0.5 s, and again rotates forward for 0.5 s and then stops for 0.5 s. After the set time for circular forward rotation, it rotates reversely for 0.5 s and then stops for 0.5 s, and again repeats such reverse rotation for a set duration. The forward and reverse rotation modes of the impeller at other loads are the same with those in Embodiment 1, but the rotation-stop ratios and rotation durations are different.

The rotation-stop ratios of the impeller corresponding to the balancing flow for different load capacities are shown as follows:

The first load: the optimal rotation-stop ratio is 0.5/1.0 s
The second load: the optimal rotation-stop ratio is 0.7/0.7 s
The third load: the optimal rotation-stop ratio is 0.8/0.8 s The rotation-stop ratio of the impeller corresponding to the balancing flow and that corresponding to the agitating flow are the same. In this embodiment, the washing is finished via applying agitating flow, enhancing flow and balancing flow each for once.

The foregoing is only in the case of washing machines with rated load capacities of 10 kg and 12 kg. But it is also applicable to washing machines with different rated load capacities, for example, 6 kg, 8 kg, etc. However, though the foregoing data is not the best for washing machines with other rated load capacities, corresponding adjustment or application of the data can also realize the overturning modes during washing.

In Embodiments 4 and 5, the rotation-stop ratio of the impeller corresponding to balancing flow and that corresponding to agitating flow for different load capacities are the same or different, the nature of which generate two types or three types of water flows. In the invention, not only two or three types of water flows are disclosed, but the rotation-stop ratio is divided into four or five types, etc. in a more detailed manner on the basis of the three types of water flows, so as to realize the fourth, fifth and more water flows. Such division requires more accurate control to the motor, that is, different rotation-stop ratios will be adopted in different set duration during washing; and during rinsing, and the water flows adopted can be the same as that during washing.

Embodiment 6

Figure 8:
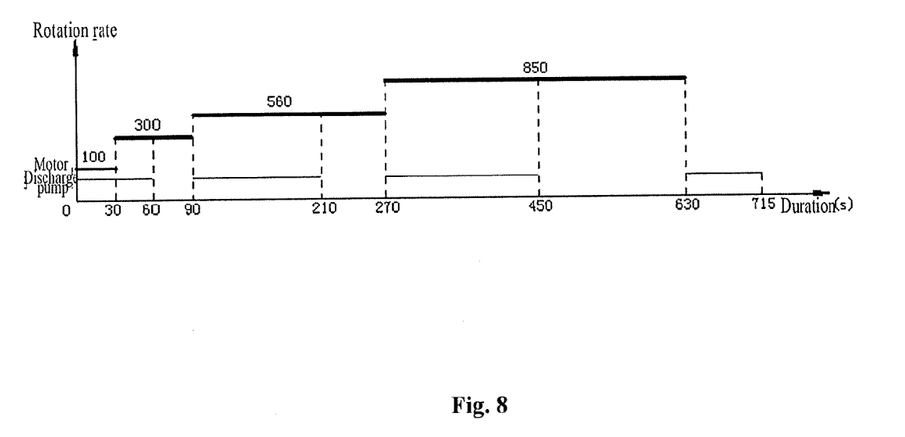
FIG. 8 is a sequence diagram of dewatering and drainage in drainage stage during rinsing and during dewatering.

As for washing machine in the invention, in the drainage stage at the end of rinsing, simultaneously the drive motor rotates and stops intermittently for dewatering. There are two stages for rotation speeds and rotation-stop modes of the motor for dewatering: during dewatering, the washing machine will use the method of the alternation of no drainage and drainage. At the end of dewatering, the wash tub stops from rotating, and drainage begins, rotation speed of the motor will increase stage by stage. This embodiment is adopted a implementation mode in the drainage stage during rinsing and during dewatering for the washing machine with rated load capacity of 10 kg (referring to FIG. 8). Details are shown as follows:

| Procedure | Action | Running mode of the motor | Duration | Rotation speed |
|---|---|---|---|---|
| Drainage stage during rinsing | Simultaneous drainage and spinning | Rotate for 1 s and stop for 3 s | 30 s | 100 rpm |
| | | Rotate for 3 s and stop for 3 s | 30 s | 300 rpm |
| Dewatering | Dewatering with no drainage | Rotate for 3 s and stop for 3 s | 30 s | 300 rpm |
| | Dewatering and drainage | Rotate continuously | 2 min | 560 rpm |
| | Dewatering with no drainage | | 1 min | 560 rpm |
| | Dewatering and drainage | | 3 min | 850 rpm |
| | Dewatering with no drainage | | 3 min | 850 rpm |
| | Inertial dewatering | | 1 min and 15 s | |
| | Brake startup and drainage | | 10 s | |

The table only discloses a running action and parameters in this embodiment. As for washing machines with different rated load capacities, the said running modes, durations and rotation speeds of the motor are different. Preferably, if the same model of washing machine has different load capacities, the said parameters are different.

Washing method in the invention largely reduces the water consumption. About 30% water can be saved for each washing. i.e., wash buffer with the same concentration needs less detergent. Hence, Water saving and detergent saving (relatively) can be achieved simultaneously. Pollution caused by drainage can be eased.

Of course, the invention is not limited to the said embodiments. As for technical schemes which are obvious to a person skilled in the art, in case of not separating from the spirit or scope of the invention, any modification or change to the invention is subject to the scope of Claims of the invention and corresponding substitution.

The invention claimed is:

1. A washing method for washing machine which contains a wash tub and an impeller arranged on the bottom of the wash tub, the washing method comprising the steps of:
   putting the clothing into the wash tub;
   detecting a load, and inflooding water according to the load; and
   washing the clothing with agitating flow, enhancing flow, and balancing flow,
   wherein the agitating flow, the enhancing flow, and the balancing flow are three types of water flows that are generated by controlling a rotation-stop ratio of the impeller, and that perform single sequential coordination or repeatedly alternating cycle coordination, so as to break the balance of the load to disperse the clothing, and so as to realize even overturn and washing, and keep the load evenly overturning,
   wherein the agitating flow breaks the balance of the load to disperse the clothing, then the enhancing flow overturns the clothing for washing, then the balancing flow maintains the circulation path for the load evenly overturning,
   wherein different gears are set according to different ranges of load capacity, which at least includes a first load indicating the minimum range of load capacity,
   wherein during washing with the enhancing flow corresponding to the first load, within a set working time of the enhancing flow, the impeller rotates and stops multiple times in the same direction as per corresponding rotation-stop ratio and then repeats the rotating and the stopping in the opposite direction, and
   wherein during washing with the agitating flow and the balancing flow corresponding to any load capacity and the enhancing flow corresponding to any load capacity excluding the first load, the impeller performs forward and reverse alternative rotations as per corresponding rotation-stop ratios.

2. The washing method for washing machine according to claim 1, wherein, during washing, an overturn path of the clothing comprises: the clothing at the bottom being dragged to the center of the impeller by the enhancing flow generated by impeller rotation, and the clothing uprushing, overturning outwardly and descending on the center of the impeller, then the clothing moving to the center of the impeller again after falling down to the bottom, the overturn process being repeated.

3. The washing method for washing machine according to claim 1, wherein an inlet water level reaches a water quantity by which the clothing is completely wetted and contacts with an upper surface of the impeller during overturn.

4. The washing method for washing machine according to claim 1, wherein an action time of the enhancing flow is at least shorter than an action time of the agitating flow.

5. The washing method for washing machine according to claim, wherein a rotation-stop ratio of the impeller corresponding to the agitating flow is the same as a rotation-stop ratio corresponding to the balancing flow.

6. The washing method for washing machine according to claim 1, wherein a rotation-stop ratio of the impeller corresponding to the agitating flow is different from a rotation-stop ratio corresponding to the balancing flow.

7. The washing method for washing machine according to claim 1, wherein an intensity of the enhancing flow is stronger than an intensity of the agitating flow.

8. The washing method for washing machine according to claim 7, wherein:
   a drive unit of the washing machine is selected from a direct drive motor; and
   an intensity of the agitating flow is adjusted according to the load capacity, such that the larger the load capacity, the stronger the intensity.

9. The washing method for washing machine according to claim 1, wherein rotation-stop ratios of the impeller corresponding to the agitating flow, the enhancing flow and the balancing flow are adjusted according to the load capacity, such that the larger the load capacity, the larger the rotation-stop ratios of the impeller corresponding to the agitating flow, the enhancing flow and the balancing flow.

10. The washing method for washing machine according to claim 1, wherein, for a rotation-stop ratio of the impeller corresponding to all flows, a time of each rotation is 0.2-3.0 s and time of each stop is 0-3.0 s, and any time within the two ranges 0.2-3.0 s and 0-3.0 s combine to form the rotation-stop ratio corresponding to all flows.

11. The washing method for washing machine according to claim 1, wherein, after washing, a drive motor rotates and stops intermittently within a set time for dewatering and drainage, then spraying and rinsing are executed with no drainage, and the drive motor rotates and stops intermittently.

12. The washing method for washing machine according to claim 1, wherein:
   in the drainage stage during rinsing, the drive motor rotates and stops intermittently for dewatering;
   during dewatering, the washing machine performs dewatering, and draining alternates on and off; and
   after dewatering, the wash tub stops from rotating and drainage begins.

* * * * *